United States Patent
Bennett et al.

(10) Patent No.: US 7,030,876 B2
(45) Date of Patent: Apr. 18, 2006

(54) SYSTEM AND METHOD FOR THREE-DIMENSIONAL IMAGING

(75) Inventors: Daniel H. Bennett, Windsor, CO (US); Samuel C. Sands, Wellington, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 10/309,557

(22) Filed: Dec. 4, 2002

(65) Prior Publication Data

US 2004/0109022 A1    Jun. 10, 2004

(51) Int. Cl.
*G06T 15/00* (2006.01)
(52) U.S. Cl. .................. 345/419; 345/427; 345/619
(58) Field of Classification Search ............ 345/418, 345/419, 420, 421, 427, 619
See application file for complete search history.

(56) References Cited

U.S. PATENT DOCUMENTS

| | | | |
|---|---|---|---|
| 5,758,122 A | 5/1998 | Corda et al. | 717/125 |
| 6,154,723 A | 11/2000 | Cox et al. | 704/270 |
| 6,289,299 B1 | 9/2001 | Daniel, Jr. et al. | 703/21 |
| 6,803,928 B1 * | 10/2004 | Bimber et al. | 715/757 |

* cited by examiner

*Primary Examiner*—Phu K. Nguyen

(57) ABSTRACT

A three-dimensional imaging system comprises a memory accessible by a processor and an immersion generator stored in the memory and adapted to acquire tracking data corresponding to a position and orientation of a viewer. The immersion generator is further adapted to obtain three-dimensional rendering calls from a non-immersive graphics application corresponding to an image model and generate a virtual representation of the image model using the tracking data and the three-dimensional rendering calls.

30 Claims, 5 Drawing Sheets

SYSTEM AND METHOD FOR THREE-DIMENSIONAL IMAGING

TECHNICAL FIELD OF THE INVENTION

The present invention relates generally to the field of imaging systems and, more particularly, to a system and method for three-dimensional imaging.

BACKGROUND OF THE INVENTION

Immersive virtual reality or three-dimensional imaging systems are used in a relatively wide array of applications. For example, virtual reality systems may comprise an enclosure, flat-panel, or other type of display environment or device for displaying images to a viewer. The viewer generally wears a tracking device, such as a head-tracking device, to determine a viewing position and orientation of the viewer relative to the display environment. Based on the viewing position and orientation of the viewer, three-dimensional images are displayed on the display environment. The viewer may also wear a stereoscopic viewing device synchronized with the frequency of image displays to produce the virtual reality visualization. Thus, for example, the three-dimensional imaging system may be used to evaluate a new product design from a variety of vantage points, produce realistic environments for a gaming application, or provide the viewer with virtual reality images for a variety of other applications.

Three-dimensional imaging systems, however, generally require sophisticated software development. Accordingly, adapting many types of software applications to virtual reality applications generally requires a large amount of time and financial resources.

SUMMARY OF THE INVENTION

In accordance with one embodiment of the present invention, a three-dimensional imaging system comprises a memory accessible by a processor and an immersion generator stored in the memory and adapted to acquire tracking data corresponding to a position and orientation of a viewer. The immersion generator is further adapted to obtain three-dimensional rendering calls from a non-immersive graphics application corresponding to an image model and generate a virtual representation of the image model using the tracking data and the three-dimensional rendering calls.

In accordance with another embodiment of the present invention, a method for three-dimensional imaging comprises obtaining three-dimensional rendering calls from a non-immersive graphics application corresponding to an image model and obtaining tracking data corresponding to a position and orientation of a viewer. The method also comprises generating a virtual representation of the image model using the three-dimensional rendering calls and the tracking data.

In accordance with another embodiment of the present invention, a three-dimensional imaging system comprises a memory accessible by a processor and an immersion generator stored in the memory and adapted to generate a virtual representation of an image model. The immersion generator is further adapted to display an interface corresponding to a non-immersive graphics application for modifying the image model.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1–5 of the drawings, like numerals being used for like and corresponding parts of the various drawings.

Figure 1:
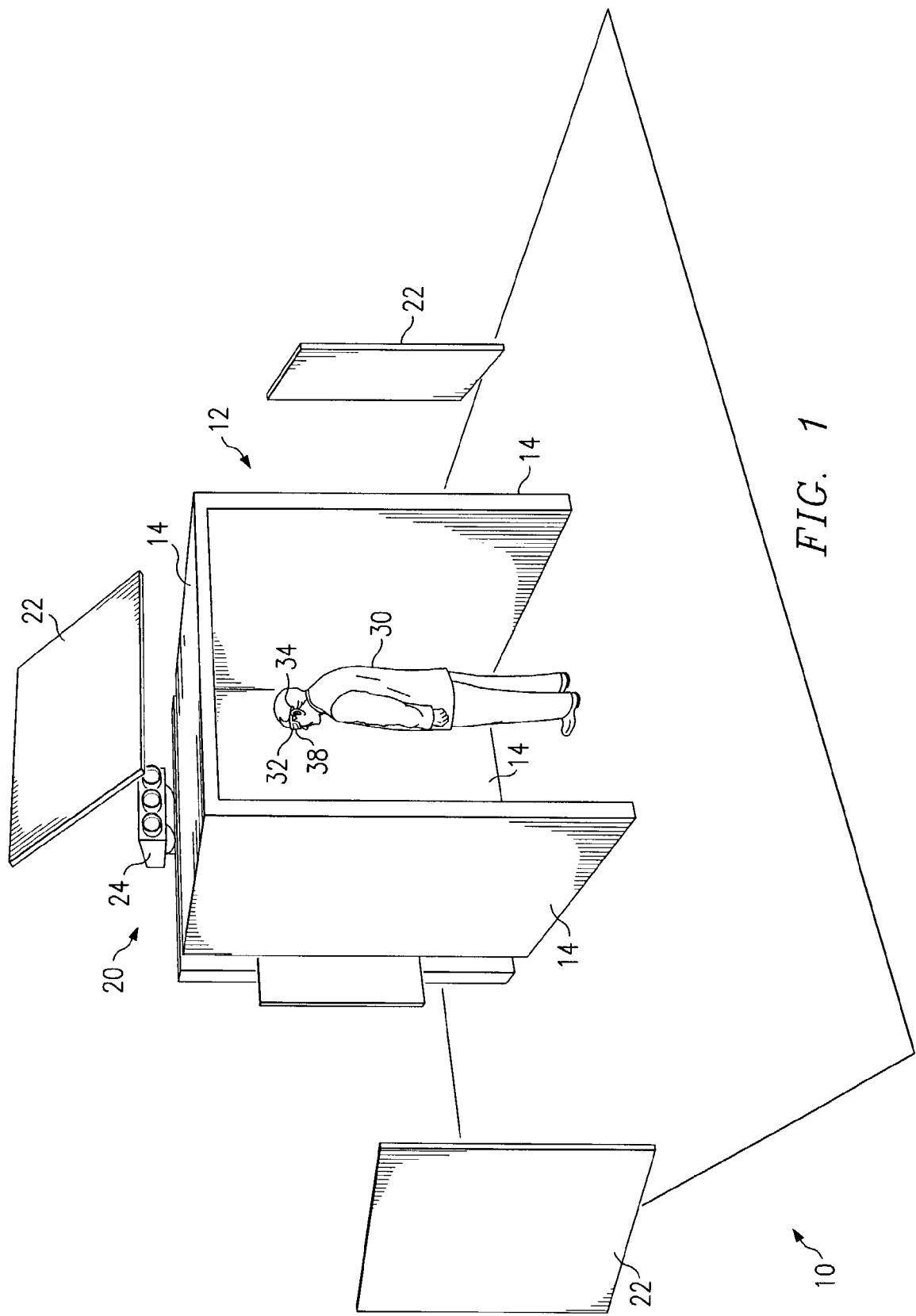
FIG. 1 is a diagram illustrating an embodiment of a three-dimensional imaging system in accordance with the present invention.

FIG. 1 is a diagram illustrating a three-dimensional imaging system 10 in accordance with an embodiment of the present invention. In the illustrated embodiment, system 10 comprises a display environment 12 onto which three-dimensional images are projected. In the illustrated embodiment, display environment 12 comprises a plurality of screens 14 onto which the three-dimensional images are projected. In this embodiment, screens 14 form three walls and a ceiling for viewing the three-dimensional images. However, it should be understood that a greater or fewer quantity of screens 14 may be provided. The three-dimensional images may also be projected onto a floor of display environment 12. Additionally, it should be understood that display environment 12 may comprise other types of devices or environments. For example, display environment 12 may comprise a headset viewing device, desktop or desk-type platform, or other display medium for displaying the three-dimensional images.

In the illustrated embodiment, system 10 also comprises a projection system 20 for projecting the three-dimensional images onto display environment 12. In this embodiment, projection system 20 comprises a plurality of reflectors 22 and projectors 24. Reflectors 22 are disposed about display environment 12 and spaced apart from each of screens 14 to reflect the three-dimensional images onto corresponding screens 14 as provided by projectors 24. However, it should be understood that the three-dimensional images may be otherwise generated on display environment 12.

In operation, a viewer 30 views the three-dimensional images projected onto display environment 12 from within display environment 12. Generally, a sensor 32 is coupled to viewer 30 for determining a viewing orientation-of viewer 30 relative to display environment 12. For example, sensor 32 may comprise a head-tracking device 34 for monitoring the viewing direction of viewer 30 relative to display environment 12. As will be described in greater detail in connection with FIG. 4, information provided by sensor 32 is used to control the images projected onto display environment 12 to create a three-dimensional simulation corresponding to the viewing direction and location of viewer 30. A stereoscopic viewing device 38 may also be used by viewer 30 for creating the three-dimensional simulation using display environment 12. For example, viewing device 38 may be synchronized with a frequency of image projection, thereby providing the illusion of a three-dimensional object or model around which or in which viewer 30 may move. In the illustrated embodiment, display environment 12 comprises an enclosure-type structure surrounding at least a portion of the viewer; however, it should be understood that other three-dimensional immersive display environments may also be used, such as, but not limited to, flat-panel structures or other types of viewing platforms.

Figure 2:
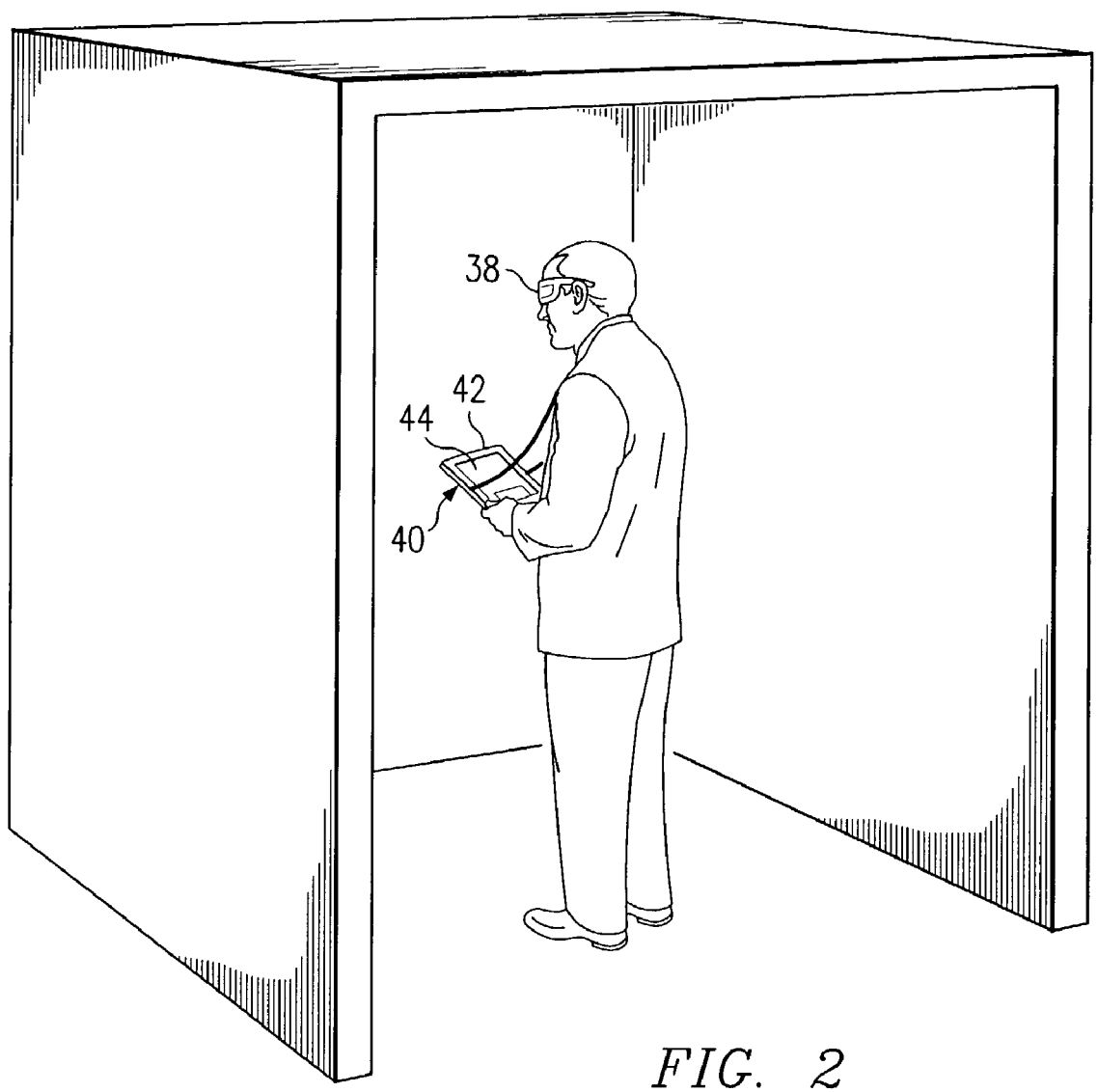
FIG. 2 is a diagram illustrating an embodiment of a portion of the three-dimensional imaging system of FIG. 1 in accordance with the present invention.

FIG. 2 is a diagram illustrating an embodiment of a portion of system 10 of FIG. 1 in accordance with the present invention. In this embodiment, system 10 also comprises a controller 40 accessible by viewer 30 within display environment 12 for providing real-time modifications to particular aspects of the three-dimensional images projected onto display environment 12. As will be described in greater detail in connection with FIG. 4, controller 40 may be used by viewer 30 to modify a three-dimensional image model, thereby resulting in corresponding changes to generated three-dimensional representations of the model projected onto display environment 12.

In the illustrated embodiment, controller 40 comprises an interactive tablet 42 accessible by viewer 30 while within display environment 12. For example, interactive tablet 42 may comprise a graphical user interface 44 for displaying various menu or control options related to modifying a desired model, such as, but not limited to, cosmetic modifications, such as color or texture, or physical modifications, such as dimensional characteristics of the model. In response to the modifications made to the model using tablet 42, the three-dimensional representations displayed on display environment 12 are automatically updated, thereby providing viewer 30 with real-time images of the model.

Figure 3:
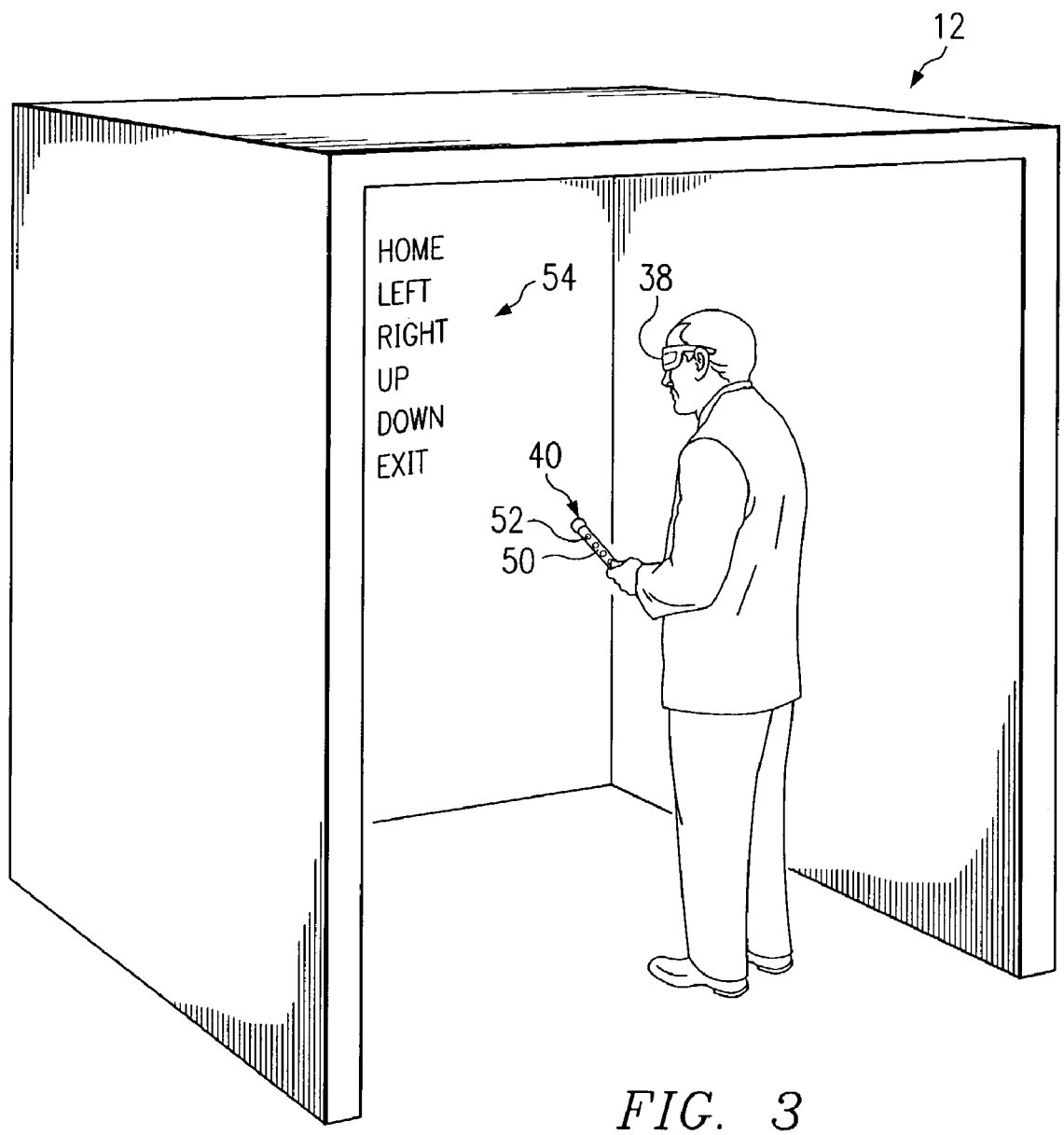
FIG. 3 is a diagram illustrating another embodiment of a portion of the three-dimensional imaging system of FIG. 1 in accordance with the present invention.

FIG. 3 is a diagram illustrating another embodiment of a portion of system 10 in accordance with the present invention. In this embodiment, controller 40 comprises a tracking wand 50 for obtaining real-time representations corresponding to modifications or other changes related to the model while viewer 30 is within display environment 12. In this embodiment, tracking wand 50 may comprise one or more control pads or buttons 52 for modifying various aspects of the model or for displaying an interface 54 on a particular screen 14 of display environment 12.

In operation, viewer 30 may depress one of buttons 52 of tracking wand 50 to generate interface 54 on display environment 12. Tracking wand 50 may then be used to select various options displayed on interface 54 to perform various functions related to the three-dimensional image model. For example, interface 54 may comprise options for viewer 30 movement in various directions relative to the model via an interface associated with the virtual reality images displayed on screens 14, for changing various features of a particular model using an interface corresponding to a design application for the model, or other associated functions corresponding to the particular type of model. For example, the model may comprise an automobile or other object such that viewer 30 may view interior or exterior images corresponding to the automobile on display environment 12. Interface 54 may be displayed on a particular screen 14 of display environment 12 in response to selecting or activating one of control buttons 52 on tracking wand 50. Interface 54 may display options such as movement in various directions relative to the automobile model such that by selecting one of the displayed interface 54 options, the three-dimensional representations projected onto display environment 12 provide viewer 30 with the requested view of the automobile model.

As will be discussed in greater detail below, tracking wand 50 may also be used to scroll through or otherwise select various features corresponding to a user interface to change various features of the model. For example, in the automobile model example described above, a user interface corresponding to the model may be displayed such that viewer 30 may select one or more of the pads 52 to navigate the interface. Thus, by navigating the user interface with tracking wand 50, viewer 30 may configure or modify various characteristics of the automobile model, such as color, texture, or other changes to the automobile model. Tracking wand 50 may also be used in connection with the user interface to modify various physical characteristics of the model, such as changing, replacing or modifying various parts or features of the automobile.

Figure 4:
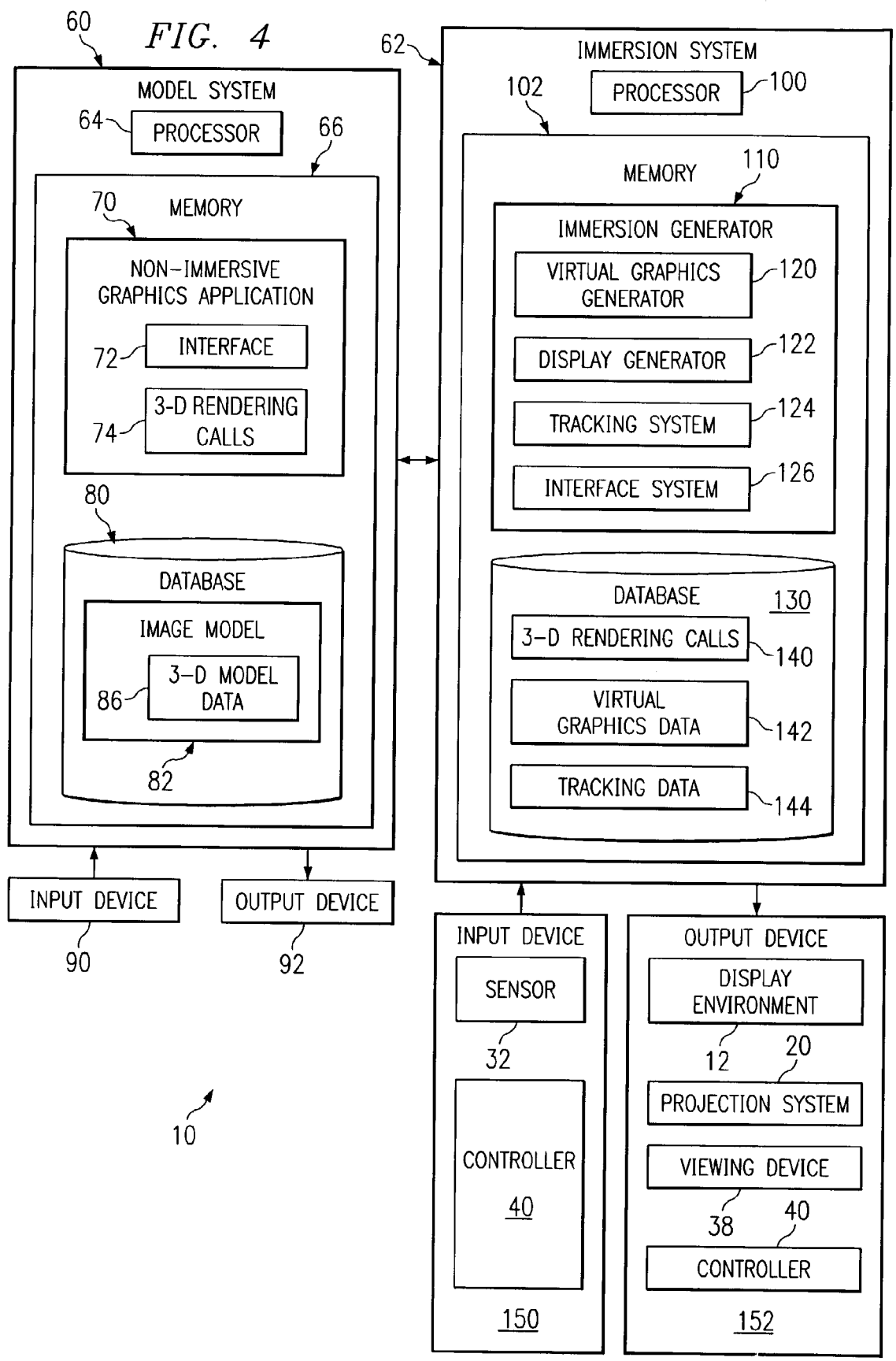
FIG. 4 is a block diagram illustrating an embodiment of the three-dimensional imaging system of FIGS. 1–3 in accordance with the present invention.

FIG. 4 is a block diagram illustrating an embodiment of system 10 in accordance with the present invention. In the illustrated embodiment, system 10 comprises a model system 60 and an immersion system 62. In the embodiment illustrated in FIG. 4, model system 60 and immersion system 62 are illustrated remote from each other; however, it should be understood that model system 60 and immersion system 62 may also be combined within a single computing environment. For example, in the embodiment illustrated in FIG. 4, model system 60 may comprise a desktop computer or other type of workstation, and immersion system 62 may comprise a server or other processing system coupled to model system 60 via wired or wireless communication techniques. However, model system 60 and immersion system 62 may also be located on a single processing platform, such as a desktop workstation.

In the embodiment illustrated in FIG. 4, model system 60 comprises a processor 64 coupled to a memory 66. The present invention also encompasses computer software that may be stored in memory 66 and executed by processor 64. In this embodiment, model system 60 comprises a non-immersive graphics application 70, which is a computer software program. However, it should be understood that non-immersive graphics application 70 may comprise software, hardware, or a combination of hardware and software. In FIG. 4, non-immersive graphics application 70 is illustrated as being stored in memory 66, where it can be executed by processor 64. In the illustrated embodiment, model system 60 also comprises a database 80 having at least one image model 82. Each image model 82 comprises three-dimensional model data 86 corresponding to a particular object such as, but not limited to, a model of a vehicle, a building, a room in a building, a landscape, or other three-dimensional object that may be designed or created. Three-dimensional model data 86 may comprise a file stored in database 80 having graphical and/or non-graphical information associated with model 82. Three-dimensional model data 86 may also comprise information associated with a displayed representation of the particular model 82. As illustrated in FIG. 4, non-immersive graphics application 70 also comprises three-dimensional rendering calls 74 for generating or otherwise creating a visual display of the particular model 82 corresponding to the three-dimensional model data 86. For example, three-dimensional rendering calls 74 may comprise an output of non-immersive graphics application 70 provided to a graphics subsystem of non-immersive graphics application 70 for generating or otherwise creating a visual display of the particular model 82.

Briefly, non-immersive graphics application 70 may be used to create, modify or otherwise manipulate three-dimensional model data 86 corresponding to a particular object via an interface 72. For example, interface 72 may comprise a graphical user interface or other desktop interface for accessing functional objects relating to non-immersive graphics application 70. Thus, interface 72 provides access to all or a portion of the functionality of the non-immersive graphics application 70 for creating, modifying, manipulating or otherwise designing a particular object. Non-immersive graphics application 70 may comprise computer-assisted design applications or other software applications for creating or modifying three-dimensional objects that generally do not include the functionality or capability to generate or provide an immersive virtual reality representation of the model data 86.

As illustrated in FIG. 4, an input device 90 and an output device 92 may be coupled to model system 60. Input device 90 may comprise a keyboard, key pad, pointing device, such as a mouse or a track pad, or other type of device for inputting information into model system 60. Thus, input device 90 may be used to access interface 72 to perform various functions relative to non-immersive graphics application 70 such as, but not limited to, creating, modifying or otherwise manipulating three-dimensional model data 86. Output device 92 may comprise a monitor, display, printer, or other type of device for generating an output.

In the embodiment illustrated in FIG. 4, immersion system 62 is coupled to model system 60 and comprises a processor 100 coupled to a memory 102. The present invention also encompasses computer software that may be stored in memory 102 and executed by processor 100. In this embodiment, immersion system 62 comprises an immersion generator 110, which comprises software, hardware, or a combination of hardware and software. In FIG. 4, immersion generator 110 is illustrated as being stored in memory 102, where it can be executed by processor 100.

In the illustrated embodiment, immersion generator 110 comprises a virtual graphics generator 120, a display generator 122, a tracking system 124, and an interface system 126, each of which may comprise software, hardware, or a combination of software and hardware. Briefly, virtual graphics generator 120 generates virtual representations corresponding to the image model 82 for projection onto display environment 12. Display generator 122 cooperates with virtual graphics generator 120 to control the display of the three-dimensional representations on display environment 12 corresponding to the position and/or viewing direction of viewer 30 to create the virtual reality simulation. Tracking system 124 cooperates with display generator 122 to provide information corresponding to the position and/or viewing direction of viewer 30. Interface system 126 provides a communication link to interface 72 of non-immersive graphics application 70 to accommodate interaction with interface 72 by viewer 30. For example, as will be described in greater detail below, viewer 30 may use controller 40, such as tablet 42 and/or wand 52, to display and interact with interface 72 via display environment 12.

In the embodiment illustrated in FIG. 4, immersion system 62 also comprises a database 130 having information associated with generating the three-dimensional representations onto display environment 12. For example, as illustrated in the embodiment of FIG. 4, database 130 comprises three-dimensional rendering calls 140, virtual graphics data 142, and tracking data 144. Three-dimensional rendering calls 140 comprise information associated with rendering calls 74 generated by non-immersive graphics application 70 corresponding to a particular image model 82. For example, immersion system 62 may receive from, or retrieve from, model system 60 three-dimensional rendering calls 74 corresponding to a particular image model 82 generated by non-immersive graphics application 70 and store all or a portion of three-dimensional rendering calls 74 as three-dimensional rendering calls 140 in database 130. Virtual graphics data 142 comprises information associated with the three-dimensional images or representations displayed on display environment 12. For example, virtual graphics data 142 may comprise information associated with a view transformation matrix corresponding to each screen 14, the images generated for projection onto each screen 14, the quantity and/or size of screens 14, or other information associated with generating a virtual representation of image model 82 on display environment 12. In FIG. 4, virtual graphics data 142 is illustrated as being stored in database 130; however, it should be understood that all or a portion of virtual graphics data 142 may processed in real-time, thereby resulting in an absence of stored information or temporal storage of information in database 130.

Tracking data 144 comprises information associated with the position of viewer 30 and the orientation or viewing direction of viewer 30. For example, as illustrated in FIG. 4, an input device 150 and an output device 152 are coupled to immersion system 62 via wired or wireless communication methods. Input device 150 may comprise any mechanism for inputting information into immersion system 62. For example, input device 150 may comprise a keyboard, key pad, pointing device, such as a mouse or a track pad, or other type of device for inputting information into immersion system 62. Input device 150 may also comprise sensor 32 and controller 40. Thus, in operation, sensor 32 acquires information corresponding to a position and viewing direction of viewer 30 relative to display environment 12. The information acquired by sensor 32 is obtained by tracking system 124 and stored as tracking data 144 in database 130. Output device 152 may comprise any type of mechanism for generating an output of immersion system 62 such as, but not limited to, a monitor or other type of output mechanism. Output device 152 may also comprise display environment 12, projection system 20, viewing device 38, and/or controller 40.

In operation, virtual graphics generator 120 generates virtual representations of model 82 on display environment 12 using three-dimensional rendering calls 74 obtained from non-immersive graphics application 70 and virtual graphics data 142. Virtual graphics generator 120 also correlates information acquired by tracking system 124 to generate the virtual representations corresponding to a position and orientation of viewer 30. Display generator 122 controls the display of the virtual representations onto display environment 12. For example, display generator 122 transmits images corresponding to the virtual representations to each of the screens 14 of display environment 12 via projection system 20. Additionally, display generator 122 synchronizes display of the virtual representations with viewing device 38 and information acquired by tracking system 124 to create the illusion or simulation of a three-dimensional object on display environment 12 corresponding to the particular image model 82. For example, as described above, display generator 122 may control synchronization of viewing device 38 with the images projected onto display environment 12.

The present invention also provides real-time manipulation of image model 82 and corresponding virtual representations on display environment 12. For example, as illustrated in FIG. 4, input devices 90 such as controller 40, which may comprise tablet 42, wand 50, or other type of device, are coupled to interface system 126 of immersion system 62 such that a user of system 10 may modify three-dimensional model data 86 for a particular image model 82. In operation, interface system 126 provides an interactive portal through which interface 72 may be displayed and/or accessed by viewer 30. Thus, interface system 126 and display generator 122 interact with each other to display interface 72 and/or the virtual representations of model 82 on display environment 12. For example, viewer 30 may use controller 40, such as tablet 42 and/or wand 50, to toggle between the virtual representations or interface 72 displayed on display environment 12. While interface 72 is displayed on display environment 12, viewer 30 may use controller 40 to modify image model 82 or perform other functions relative to image model 82 via non-immersive graphics application 70. Additionally, display generator 122 and interface system 126 may also be configured to simultaneously display both the virtual representations of model 82 and interface 72 on display environment 12.

Alternatively, immersion system 62 may also be configured to provide viewer 30 with substantially continuous access to interface 72. For example, interface system 126 may be configured to provide access to interface 72 via tablet 42. Thus, in operation, interface system 126 may be configured to communicate information between tablet 42 and interface 72 such that viewer 30 may modify or perform other functions relative to model data 86 while viewing the virtual representations on display environment 12.

In response to a modification to image model 82, the virtual representations displayed on environment 12 are automatically updated corresponding to the modified model 82. For example, in response to a modification to image model 82, non-immersive graphics application 70 generates three-dimensional rendering calls 74 corresponding to the modifications. Additionally, immersion system 62 obtains the rendering calls 74 generated by non-immersive graphics application 70 corresponding to the modified image model 82 and automatically updates the virtual representations displayed on environment 12. Depending on the number of modifications to image model 82, computational requirements to make the modification(s), and the power requirements of system 62, the updated virtual representations may appear to viewer 30 immediately or with perhaps a slight delay. Immersion generator 110 and/or non-immersive graphics application 70 may be configured to communicate with each other such that immersion generator 110 is apprised of the modification to image model 82. For example, immersion generator 110 may be configured to monitor three-dimensional model data 86 for modifications, non-immersive graphics application 70 may be configured to transmit a signal to immersion generator 110 in response to a modification to image model 82, and/or non-immersive graphics application 70 may automatically transmit updated three-dimensional model data 86 to immersion generator 110 in response to a modification. Alternatively, in response to actuation of controller 40 to display interface 72, interface system 126 may communicate with virtual graphics generator 120 to indicate that non-immersive graphics application 70 is being accessed by viewer 30. Thus, in response to a display of interface 72, immersion generator 110 may automatically monitor activities relative to non-immersive graphics application 70 and model data 86 for modifications to model data 86. However, it should be understood that immersion system 62 may be otherwise configured to obtain the updated three-dimensional model data 86 in response to a modification. Thus, the present invention provides real-time manipulation of an image model 82 while displaying three-dimensional images of the image model 82 on display environment 12. Additionally, the present invention also provides viewer 30 with the ability to modify image models 82 using a virtual environment without having to leave the virtual environment, thereby enhancing image model 82 development.

The present invention also provides virtual reality image model 82 development without requiring expensive and time-consuming software development corresponding to particular applications. For example, the present invention may be configured as a stand-alone component adapted to communicate and interact with a variety of non-immersive applications 70. Thus, off-the-shelf software components or specially-developed software components for creating three-dimensional image models 82 that are not virtual reality enabled may be used in a virtual reality environment via immersion system 62. For example, immersion generator 110 cooperates with non-immersive graphics application 70 to generate virtual representations of an image model 82 by using the rendering callas 74 generated by non-immersive graphics application 70 to create a virtual reality environment representing the model 82. Therefore, because the virtual representations are generated from the rendering callas 74 of the non-immersive graphics application 70, system 10 enables non-virtual reality applications to be treated like virtual reality applications. Thus, the present invention provides greater flexibility than prior imaging systems by providing virtual reality imaging for a variety of non-immersive three-dimensional applications.

Figure 5:
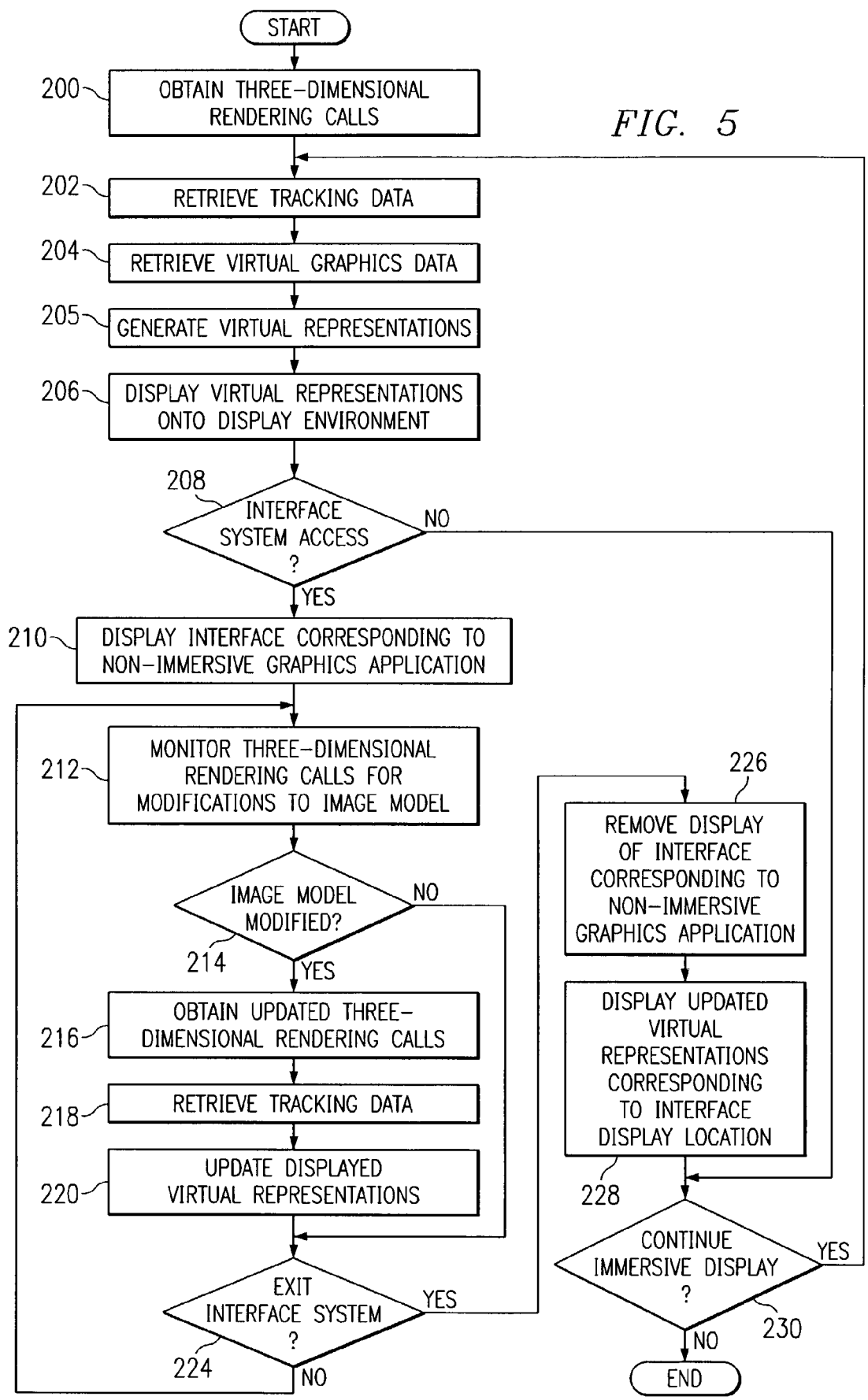
FIG. 5 is a flow chart illustrating a three-dimensional imaging method in accordance with the present invention.

FIG. 5 is a flow chart illustrating an embodiment of a three-dimensional imaging method in accordance with the present invention. The method begins at step 200, where immersion generator 110 obtains three-dimensional rendering calls 74 from non-immersive graphics application 70. For example, virtual graphics generator 120 may retrieve three-dimensional rendering calls 74 from non-immersive graphics application 70 or non-immersive graphics application 70 may be configured to automatically transmit rendering calls 74 to immersion system 62. At step 202, immersion generator 110 retrieves tracking data 144 to determine the position and orientation of viewer 30 relative to display environment 12.

At step 204, immersion generator 110 retrieves virtual graphics data 142 for creating the images for a virtual reality representation of the image model 82 on display environment 12. At step 205, virtual graphics generator 120 generates the visual representations corresponding to the model 82. For example, virtual graphics generator 120 evaluates tracking data 144 and the three-dimensional rendering calls 74 generated by non-immersive graphics application 70 to create the images that will be projected onto each of the screens 14 of display environment 12. At step 206, immersion generator 110 projects the virtual representations onto display environment 12. For example, virtual graphics generator 120 may interface or communicate with display generator 122 to transmit each of the images associated with the virtual representation of the model 82 to projection system 20 so that each of the images may be projected onto a corresponding screen 14 to create the virtual reality representation of image model 82.

At decisional step 208, a determination is made whether viewer 30 desires to access interface system 126. For example, as described above, viewer 30 may select a function on controller 40, such as actuating a function on tablet 42 or depressing a functional button on wand 50, to access interface system 126. If access to interface system 126 is not desired, the method proceeds to step 230. If access to interface system 126 is desired, the method proceeds from step 208 to step 210, where immersion generator 120 displays interface 72 on display environment 12. For example, interface 72 may be displayed on a wall 14 of display environment 12 such that viewer 30 may readily view and access the various functions of non-immersive graphics application 70. However, as described above, access to interface 72 may be otherwise provided to viewer 30.

At step 212, immersion generator 110 monitors three-dimensional rendering calls 74 for modifications to model 82. At decisional step 214, a determination is made whether a modification to image model 82 has been performed. For example, as described above, immersion generator 110 may be configured to communicate with non-immersive graphics application 70 to monitor or automatically receive three-dimensional rendering calls 74 corresponding to changes or modifications to image model 82. If a modification to image model 82 has not been performed, the method proceeds from step 214 to step 224. If a modification to image model 82 has been performed, the method proceeds from step 214 to step 216, where immersion generator 110 obtains the updated three-dimensional rendering calls 74 corresponding to the modified model 82.

At step 218, immersion generator 110 retrieves tracking data 144 corresponding to viewer 30. At step 220, immersion generator displays the updated virtual representations on environment 12 corresponding to the rendering calls 74 received from non-immersive graphics application 70. Thus, as non-immersive graphics application 70 outputs rendering calls 74 corresponding to a modification to model 82, immersion system 62 automatically receives the rendering calls 74 and automatically updates the virtual representations displayed on environment 12 of the model 82.

At decisional step 224, a determination is made whether viewer 30 desires to exit interface system 126. If viewer 30 desires to continue access to interface system 126, the method returns to step 212. If viewer 30 desires to exit interface system 126, the method proceeds from step 224 to step 226, where immersion generator 110 removes a display of interface 72 from display environment 12. At step 228, immersion generator 110 then displays the updated virtual representation images on the portion of display environment 12 previously used for displaying interface 72. At decisional step 230, a determination is made whether viewer 30 desires to continue the immersive display of image model 82. If viewer 30 desires to continue the display of image model 82, the method returns to step 202.

It should be understood that in the described method, certain steps may be omitted, combined, or accomplished in a sequence different than depicted in FIG. 5. Also, it should be understood that the method depicted may be altered to encompass any of the other features or aspects of the invention as described elsewhere in the specification. For example, as described above, immersion generator 110 may be configured to display interface 72 on display environment 12 and/or on controller 40, such as the interactive tablet 42.

What is claimed is:

1. A three-dimensional imaging system, comprising:
a memory accessible by a processor; and
an immersion generator stored in the memory and adapted to acquire tracking data corresponding to an orientation and position of a viewer, the immersion generator further adapted to obtain three-dimensional rendering calls from a non-immersive graphics application corresponding to an image model and generate a virtual representation of the image model using the tracking data and the three-dimensional rendering calls.

2. The system of claim 1, wherein the immersion generator comprises a display generator adapted to display the virtual representation on a display environment.

3. The system of claim 1, further comprising a sensor adapted to transmit the tracking data to the immersion generator.

4. The system of claim 1, further comprising a projection system adapted to project the virtual representation onto a display environment.

5. The system of claim 1, wherein the immersion generator comprises a tracking system adapted to acquire tracking data corresponding to the viewer.

6. The system of claim 1, wherein the immersion generator comprises an interface system adapted to display an interface corresponding to the non-immersive graphics application.

7. The system of claim 1, wherein the immersion generator is adapted to transmit information associated with the image model from the viewer to the non-immersive graphics application.

8. The system of claim 1, wherein the immersion generator is adapted to monitor the three-dimensional rendering calls for modifications.

9. The system of claim 1, wherein the immersion generator is adapted to display an interface corresponding to the non-immersive graphics application on a display environment.

10. The system of claim 1, wherein the immersion generator is adapted to automatically update the virtual representation in response to a modification to the image model.

11. A method for three-dimensional imaging, comprising:
obtaining three-dimensional rendering calls from a non-immersive graphics application corresponding to an image model;
obtaining tracking data corresponding to an orientation and position of a viewer; and
generating a virtual representation of the image model using the three-dimensional rendering calls and the tracking data.

12. The method of claim 11, further comprising displaying the virtual representation to the viewer on a display environment.

13. The method of claim 11, further comprising monitoring the three-dimensional rendering calls for a modification to the image model.

14. The method of claim 11, further comprising displaying an interface to the viewer corresponding to the non-immersive graphics application.

15. The method of claim 11, further comprising automatically updating the virtual representation in response to a modification to the image model.

16. The method of claim 11, further comprising communicating information corresponding to the image model between the viewer and the non-immersive graphics application.

17. The method of claim 11, further comprising displaying an interface corresponding to the non-immersive graphics application on a display environment.

18. A three-dimensional imaging system, comprising:
means for obtaining three-dimensional rendering calls from a non-immersive graphics application corresponding to an image model;
means for obtaining tracking data corresponding to an orientation and position of a viewer; and
means for generating a virtual representation of the image model using the three-dimensional rendering calls and the tracking data.

19. The system of claim 18, further comprising means for displaying an interface corresponding to the non-immersive graphics application to the viewer.

20. The system of claim 18, further comprising means for monitoring the three-dimensional rendering calls for a modification to the image model.

21. The system of claim 18, further comprising means for automatically updating the virtual representation in response to a modification to the image model.

22. The system of claim 18, further comprising means for communicating information associated with the image model between the viewer and the non-immersive graphics application.

23. The system of claim 18, further comprising means for displaying the virtual representation to the viewer on a display environment.

24. A three-dimensional imaging system, comprising:
a memory accessible by a processor; and
an immersion generator stored in the memory and adapted to generate a virtual representation of an image model, the immersion generator further adapted to display an interface corresponding to a non-immersive graphics application for modifying the image model.

25. The system of claim 24, wherein the immersion generator is further adapted to monitor the non-immersive graphics application for a modification to the image model.

26. The system of claim 24, wherein the immersion generator is further adapted to automatically update the virtual representation in response to a modification to the image model.

27. The system of claim 24, wherein the immersion generator is adapted to display the interface on a display environment.

28. The system of claim 24, wherein the immersion generator is adapted to display the interface via an interactive tablet.

29. The system of claim 24, where in the immersion generator is adapted to communication information associated with the image model between a viewer of the virtual representation and the non-immersive graphics application via the interface.

30. The system of claim 24, further comprising a controller accessible by a viewer of the virtual representation and adapted to access the interface.

* * * * *